US012608916B2

(12) United States Patent
Bai et al.

(10) Patent No.: US 12,608,916 B2
(45) Date of Patent: Apr. 21, 2026

(54) DATA AUGMENTATION BASED ON ATTENTION

(71) Applicant: Lemon Inc., Grand Cayman (KY)

(72) Inventors: Song Bai, Singapore (CN); Jieneng Chen, Beijing (CN); Shuyang Sun, Beijing (CN); Ju He, Beijing (CN); Bin Lu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 584 days.

(21) Appl. No.: 17/740,211

(22) Filed: May 9, 2022

(65) Prior Publication Data

US 2022/0270353 A1     Aug. 25, 2022

(51) Int. Cl.
*G06V 10/77* (2022.01)
*G06N 20/00* (2019.01)
*G06V 10/26* (2022.01)
*G06V 10/48* (2022.01)
*G06V 10/774* (2022.01)

(52) U.S. Cl.
CPC ......... *G06V 10/7715* (2022.01); *G06N 20/00* (2019.01); *G06V 10/26* (2022.01); *G06V 10/48* (2022.01); *G06V 10/774* (2022.01)

(58) Field of Classification Search
CPC .... G06V 10/7715; G06V 10/48; G06V 10/26; G06V 10/774; G06N 20/00
See application file for complete search history.

(56) References Cited

U.S. PATENT DOCUMENTS

| | | | | |
|---|---|---|---|---|
| 11,961,281 | B1 * | 4/2024 | Kim | G06V 20/64 |
| 2019/0065817 | A1 * | 2/2019 | Mesmakhosroshahi | |
| | | | | G06V 20/698 |
| 2019/0205761 | A1 * | 7/2019 | Wu | G06F 16/353 |
| 2021/0027098 | A1 * | 1/2021 | Ge | G06F 18/217 |

(Continued)

FOREIGN PATENT DOCUMENTS

| | | | | | |
|---|---|---|---|---|---|
| CN | 113887610 | A | * | 1/2022 | G06F 18/2415 |
| CN | 114997395 | A | * | 9/2022 | G06N 3/08 |

OTHER PUBLICATIONS

Sangdoo et al., "Cutmix: Regularization strategy to train strong classifiers with localizable features," Proceedings of the IEEE/CVF International Conference on Computer Vision (ICCV), pp. 6023-6032 (2019).

(Continued)

*Primary Examiner* — Qun Shen
(74) *Attorney, Agent, or Firm* — Faegre Drinker Biddle & Reath LLP

(57) ABSTRACT

Implementations of the present disclosure relate to methods, devices, and computer program products for data augmentation. In the method, mixed data is generated from first data and second data, and the mixed data comprises a first portion from the first data and a second portion from the second data. An attention map is obtained for the mixed data based on distributions of the first and second portions in the mixed data, here the attention map describes contributions of the first and second data to the mixed data. A label is determined for the mixed data based on the attention map and a first label for the first data and a second label for the second data. With these implementations, the label is determined based on the contributions of the first and second images in an accurate and effective way, and thus has a value that is much closer to the ground true.

18 Claims, 9 Drawing Sheets

100

110 FIRST IMAGE

120 SECOND IMAGE

130 MIXED IMAGE

140 MIXED IMAGE

(56) References Cited

U.S. PATENT DOCUMENTS

| | | | |
|---|---|---|---|
| 2021/0319255 A1* | 10/2021 | Pham | G06V 10/82 |
| 2021/0357684 A1* | 11/2021 | Amirghodsi | G06N 3/09 |
| 2022/0036194 A1* | 2/2022 | Sundaresan | G06N 3/063 |
| 2022/0336058 A1* | 10/2022 | Merchant | G16B 20/00 |
| 2023/0113643 A1* | 4/2023 | Mittal | G06F 16/75 |
| | | | 382/159 |
| 2023/0289967 A1* | 9/2023 | Jalal | G06T 7/0012 |
| 2024/0038252 A1* | 2/2024 | Fan | G10L 21/02 |

OTHER PUBLICATIONS

Zhang et al, "Mixup: Beyond empirical risk minimization," ICLR (2018).
Vaswani et al., "Attention is all you need," NeurIPS, pp. 5998-6008 (2017).

* cited by examiner

300

140 MIXED IMAGE

242 SECOND PORTION

240 FIRST PORTION

310 MASK

500

700A 710A    720A    730A    740A

CUTMIX:
FIRST IMAGE=40%
SECOND IMAGE=60%

TRANSMIX:
FIRST IMAGE=80%
SECOND IMAGE=20%

700B 710B    720B    730B    740B

CUTMIX:
FIRST IMAGE=11%
SECOND IMAGE=89%

TRANSMIX:
FIRST IMAGE=28%
SECOND IMAGE=72%

700C 710C    720C    730C    740C

CUTMIX:
FIRST IMAGE=10%
SECOND IMAGE=90%

TRANSMIX:
FIRST IMAGE=23%
SECOND IMAGE=77%

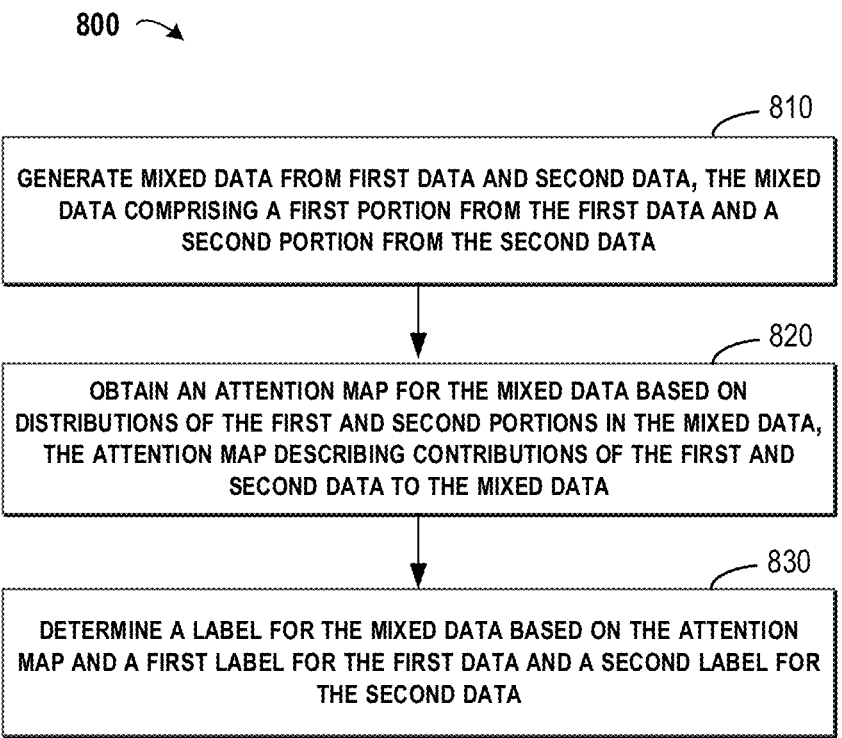

800

810

GENERATE MIXED DATA FROM FIRST DATA AND SECOND DATA, THE MIXED DATA COMPRISING A FIRST PORTION FROM THE FIRST DATA AND A SECOND PORTION FROM THE SECOND DATA

820

OBTAIN AN ATTENTION MAP FOR THE MIXED DATA BASED ON DISTRIBUTIONS OF THE FIRST AND SECOND PORTIONS IN THE MIXED DATA, THE ATTENTION MAP DESCRIBING CONTRIBUTIONS OF THE FIRST AND SECOND DATA TO THE MIXED DATA

830

DETERMINE A LABEL FOR THE MIXED DATA BASED ON THE ATTENTION MAP AND A FIRST LABEL FOR THE FIRST DATA AND A SECOND LABEL FOR THE SECOND DATA

DATA AUGMENTATION BASED ON ATTENTION

FIELD

The present disclosure generally relates to data augmentation, and more specifically, to methods, devices and computer program products for data augmentation based on attention.

BACKGROUND

In the machine learning field, network models are trained by a great number of training samples, while the process for obtaining the training samples involves a lot of heavy manual labor. Data augmentation has been proposed to generate more training samples based on existing training samples. For example, mixed data may be generated from existing samples and then a label may be determined for the mixed data. At this point, how to determine the label for the mixed data in an accurate and effective way becomes a hot focus.

SUMMARY

In a first aspect of the present disclosure, there is provided a method for data augmentation. In the method, mixed data is generated from first data and second data, and the mixed data comprises a first portion from the first data and a second portion from the second data. An attention map is obtained for the mixed data based on distributions of the first and second portions in the mixed data, here the attention map describes contributions of the first and second data to the mixed data. A label is determined for the mixed data based on the attention map and a first label for the first data and a second label for the second data.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

FIG. 8 illustrates an example flowchart of a method for data augmentation according to implementations of the present disclosure.

DETAILED DESCRIPTION

Figure 1:
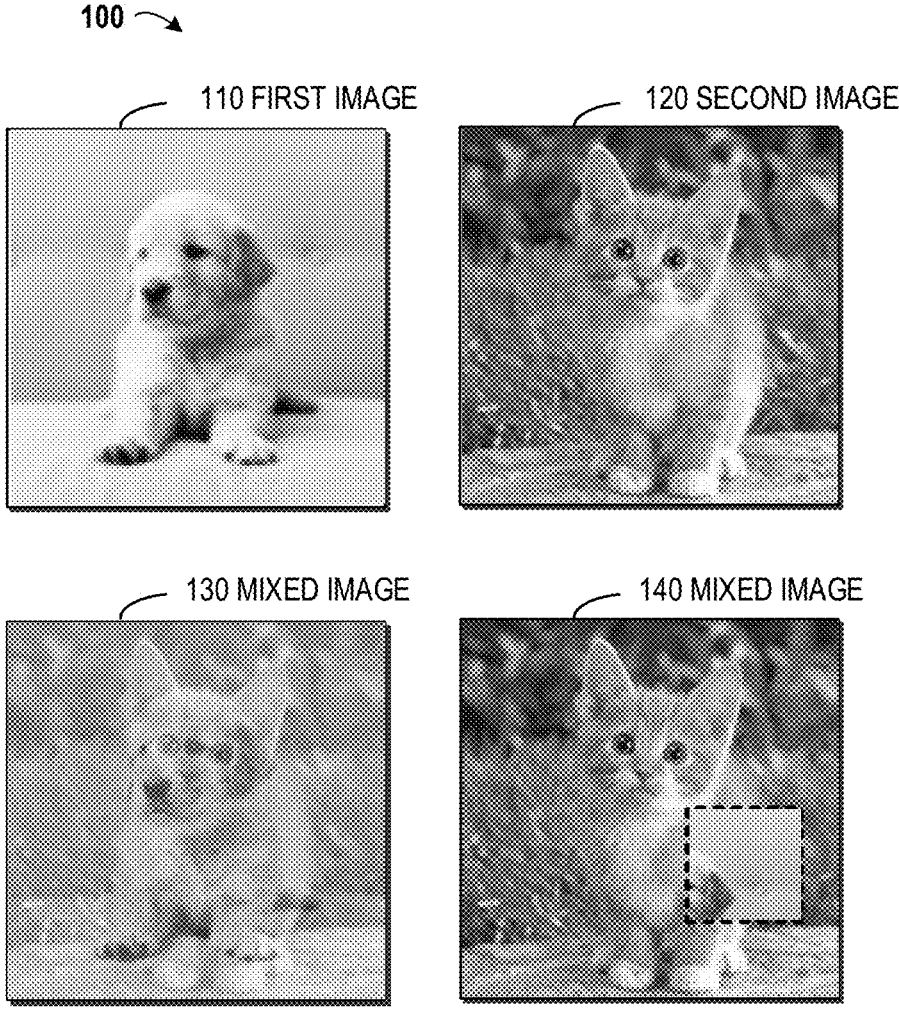
FIG. 1 illustrates an example diagram for image augmentation according to conventional solutions.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

In the machine learning field, performance of the machine learning model heavily depends on the training samples. Usually, a great number of training samples should be obtained for training the machine learning model. For example, in an example environment of image processing, a classifying model may be generated and trained by a group of training samples for image classification. Each training sample may include an image and a label for classifying the image into a specific classification. Usually, the label is manually provided and thus results in a time-consuming and labor-intensive procedure. For example, the label may be represented by a real number, where 0 may indicate that the image is classified as a cat and 1 may indicate that the image is classified as a dog. If the group of training samples does not include sufficient samples that cover lots of classification situations, the classifying model cannot output a correct classification. Recently, data augmentation is used to extend the existing training samples.

Various image augmentation solutions have been proposed for generating training samples in an automatic way. Hereinafter, reference will be made to FIG. 1 for more details about data augmentation in image processing. FIG. 1 illustrates an example diagram 100 for image augmentation according to conventional solutions. As illustrated in FIG. 1, a first image 110 (represented as $x_A$) with a first label (represented as $y_A$) and a second image 120 (represented as $x_B$) with a second label (represented as $y_B$) are received as source images for generating new training samples. In a Mixup solution, pixels in the first and second images 110 and 120 may be mixed to generate a mixed image 130. In other words, the first image 110 is overlapped with the second image 120, and each pixel in the mixed image 130 may be determined based on respective pixels in the first and second image 110 and 120. Similarly, the label for the mixed image 130 may be determined from the first and second labels. Specifically, the mixed image 130 may be determined based on $\lambda x_A + (1-\lambda) x_B$ with a label of $\lambda y_A + (1-\lambda) y_B$. Here $\lambda \in [0,1]$ represents a random mixing proportion sampled from a Beta distribution. This pre-assumes that linear interpolations of feature vectors should lead to linear interpolations of the associated targets. However, the above pre-assumption does not always stay true since not all pixels are created equal.

According to a CutMix solution, a mixed image 140 is generated by cutting and pasting a portion from the first image 110 into the second image 120. Further, a label may be determined based on an area comparison between respective portions in the first and second images 110 and 120. However, pixels in the background will not contribute to the label space as equally as those in the salient area. Sometimes, no valid object in the first image 110 is pasted into the mixed image 140, but the first image 110 still affect the label space, this leads to an incorrect label that cannot reflect a real classification of the mixed image 140. Although some solutions try to solve this problem by means of mixing the most descriptive portions on the input level, manipulating on the input level may narrow the space of augmentation since it tends to use less background portions into the mixed image. Meanwhile, these solutions lead to more parameters and/or training throughput during the image augmentation.

In view of the above, the present disclosure proposes a data augmentation solution "TransMix," which may generate the label for the mixed image by mixing original labels based on an attention map of the mixed image. Specifically, a weight may be assigned to the first image 110 based on the sum of weights of attention map corresponding to the first image 110 in the mixed image. In this way, the label may be re-weighted by the significance of portions in the mixed image instead of linearly interpolated with the same ratio as the mixed inputs. Further, various existing models naturally generate the attention map, and then the proposed TransMix solution may be merged into the training pipeline of the existing models with no extra parameters and minimal computation overhead.

Instead of investigating how to better mix images on the input level, implementations of the present disclosure focus more on narrowing down the gap between the input and the label space through the learning of label assignment. With the proposed TransMix solution, the accuracy level of the generated label may be greatly increased when the source images are weighted higher by the attention map.

Figure 2:
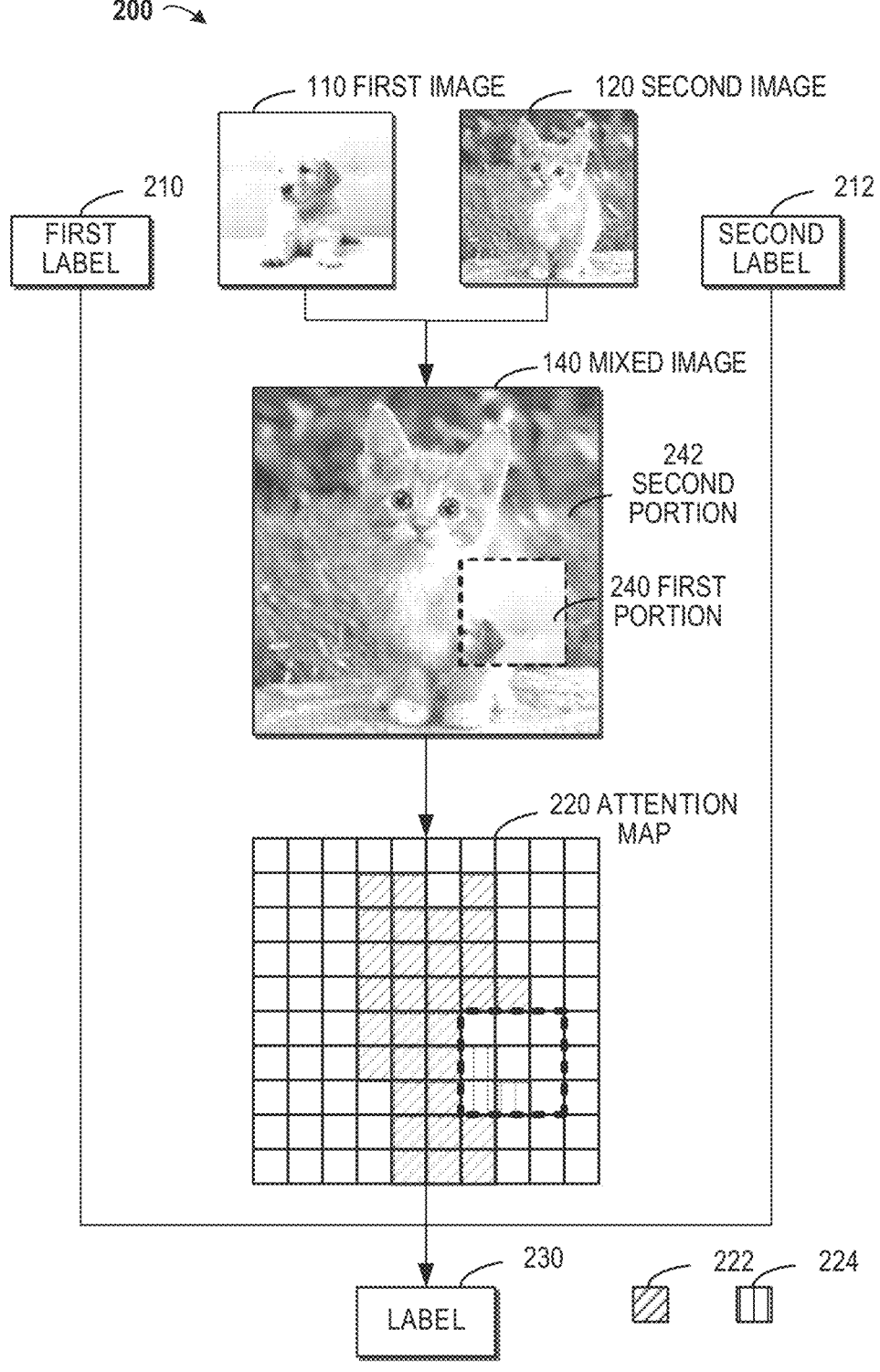
FIG. 2 illustrates an example diagram for determining a label for a mixed image according to implementations of the present disclosure.

Referring to FIG. 2 for a brief description of implementations of the present disclosure, FIG. 2 illustrates an example diagram 200 for determining a label for a mixed image according to implementations of the present disclosure. As illustrated in FIG. 2, the mixed image 140 may be generated from the first and second images 110 and 120, here the mixed image 140 comprises a first portion 240 from the first image 110 and a second portion 242 from the second image 120. Further, an attention map 220 may be obtained for the mixed image 140 based on distributions of the first and second portions 240 and 242 in the mixed image 140. The attention map 220 may describe contributions of the first and second images 110 and 120 to the mixed image 140. For example, a legend 222 may indicate important areas in the second image 120 that make more contributions to the label 230 for the mixed image 140, and a legend 224 may indicate important areas in the first image 110. Moreover, the label 230 may be generated for the mixed image 140 based on the attention map 220 and a first label 210 for the first image 110 and a second label 212 for the second image 120.

Figure 3:
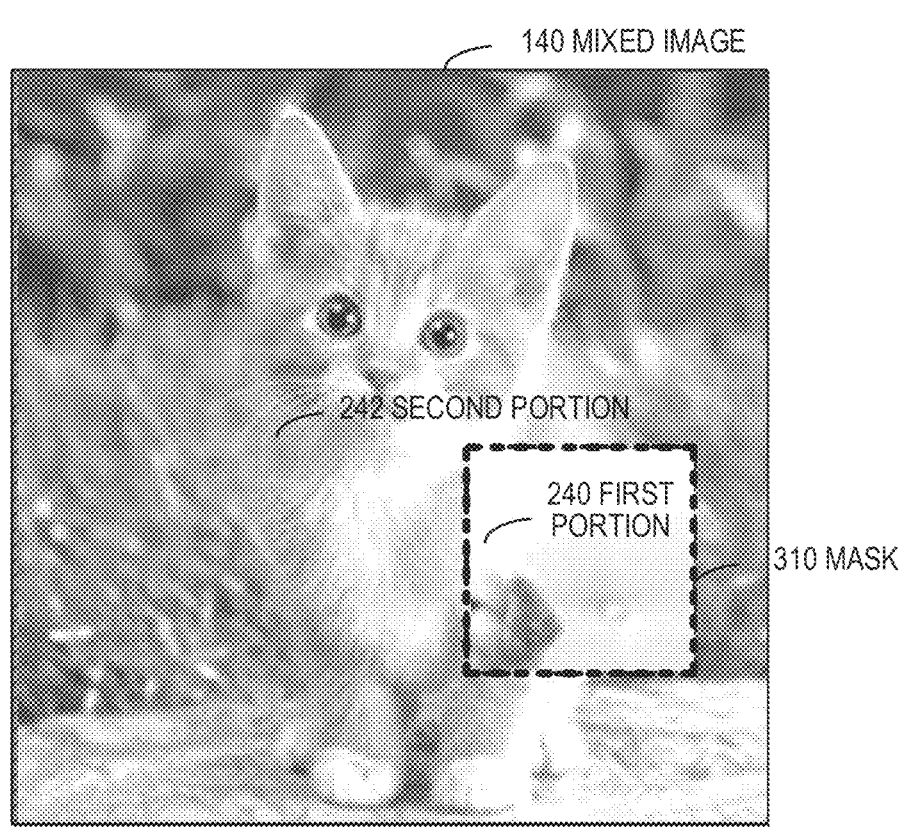
FIG. 3 illustrates an example diagram for generating a mixed image according to implementations of the present disclosure.

Referring to FIG. 3 for more details about generating the mixed image 140. FIG. 3 illustrates an example diagram 300 for generating the mixed image 140 according to implementations of the present disclosure. As illustrated in FIG. 3, a first portion 240 may be cut from the first image 110 and then pasted into the second image 120 to obtain the mixed image 140. Here, the first portion 240 may be selected in various ways. For example, the first portion 240 may have a predetermined size (for example, 64*64 pixels or another size), the first portion 240 may be selected from a predetermined position (for example, the center or the top left corner of the first image 110). Alternatively and/or in addition to, the size of the first portion 240 should be less than the size of the second image 120, and thus the first portion 240 should be down-sampled if the first portion 240 is greater than the second image 120.

Further, a destination position of the first portion 240 may be defined by a mask 310 in the second image 120, here the mask 310 describes a boundary between the first portion 240 and the second portion 242 in the mixed data 140. In implementations of the present disclosure, the mask 310 may be represented by a bitmap with a same size as that of the mixed image 140. For example, if the second image 120 has a width of W and a height of H, then the bitmap may be represented as a matrix M with a size of W*H, where $m_{i,j}=0$ represents that the pixel (i,j) belongs to the second image 120, and $m_{i,j}=1$ represents that the pixel (i,j) belongs to the first image 120. Afterwards, the first portion 240 may be pasted into the second image 120 according to the mask 310, so as to generate the mixed image 140. In implementations of the present disclosure, the mixed image 140 may be determined based on Formula 1 as below:

$$\tilde{x}=M\odot x_A+(1-M)\odot x_B \qquad \text{Formula 1}$$

Where $\tilde{x}$ represents the mixed image 140, M represents a binary mask indicating a boundary of the first portion 240 in the first image 110 (represented as $x_A$) and the second portion 242 in the second image 120 (represented as $x_B$), and $\odot$ represents element-wise multiplication. With these implementations, the mixed image 140 may be generated in an easy and effective way without complex computations.

It is to be understood that the above paragraph just provides an example format for defining the mask 310, and other formats may be adopted in other implementations. For example, values in M may be reversed, and 0 may represent the first image 110 and 1 may represent the second image 120. In another example, the mask 310 may be defined by four corners of the first portion 240, or a corner and a side length of the first portion 240. In implementations of the present disclosure, the mixed image 140 and the second image 120 may have the same size. Alternatively and/or in addition to, the mixed image 140 and the second image 120 may have different sizes. At this point, the second image 120 may be up-sampled or down-sampled to a different size in generating the mixed image 140. Although FIG. 3 shows that the first portion 240 is placed within the second image 120 for generating the mixed image 140, another mask may indicate that the first image 110 and the second image 120 are placed side by side. For example, the first image 110 may be placed on the left and the second image 120 may be placed on the right.

Once the mixed image 140 is generated, an attention procedure may further be implemented on the mixed image 140 to obtain the attention map 220 that describes contributions of the first and second images 110 and 120 to the mixed data 140. In implementations of the present disclosure, the attention map 220 may be determined based on the self-attention technique. Here, the self-attention may be implemented on a token sequence $x\in\mathbb{R}^{N*d}$, where N represents the number of tokens, and each token has a length of d. In other words, the token sequence includes N tokens and each token has a length of d. Further, the token sequence x may be linearly projected to queries, keys and values, by using weight matrices $w_q\in\mathbb{R}^{d*d_q}$, $w_k\in\mathbb{R}^{d*d_k}$, and $w_v\in\mathbb{R}^{d*d_v}$, here q=$xw_q$, k=$xw_k$, and v=$xw_v$, and $d_q=d_k$. Queries and keys are used to compute a self-attention map A=(q, k)=Softmax(qk$^T$/$\sqrt{d_k}$)$\in\mathbb{R}^{N*N}$, and the output of the self-attention operation is defined as the weighted sum of N token features in v with the weights corresponding to the self-attention map: Attention(q, k, v)=A(q, k)v. Single-head self-attention may be extended to multi-head self-attention by linearly projecting the queries, keys, and values g times with different, learned linear projections to $d_q$, $d_k$ and $d_v$ dimensions, respectively.

In implementations of the present disclosure, the above self-attention technique may be used for obtaining the attention map 220. Specifically, the token sequence x may be built from the mixed image 140, and thus the query parameter and the key parameter for the self-attention operation may be determined based on the token sequence. Then, the attention map 220 may be determined based on the query and key parameters according to the above self-attention procedure. With these implementations, the technical problem of determining the attention map 220 may be converted into building the token sequence from the mixed image 140, and then the attention map 220 may be obtained easily and effectively by applying the above self-attention procedure to the token sequence.

Figure 4:
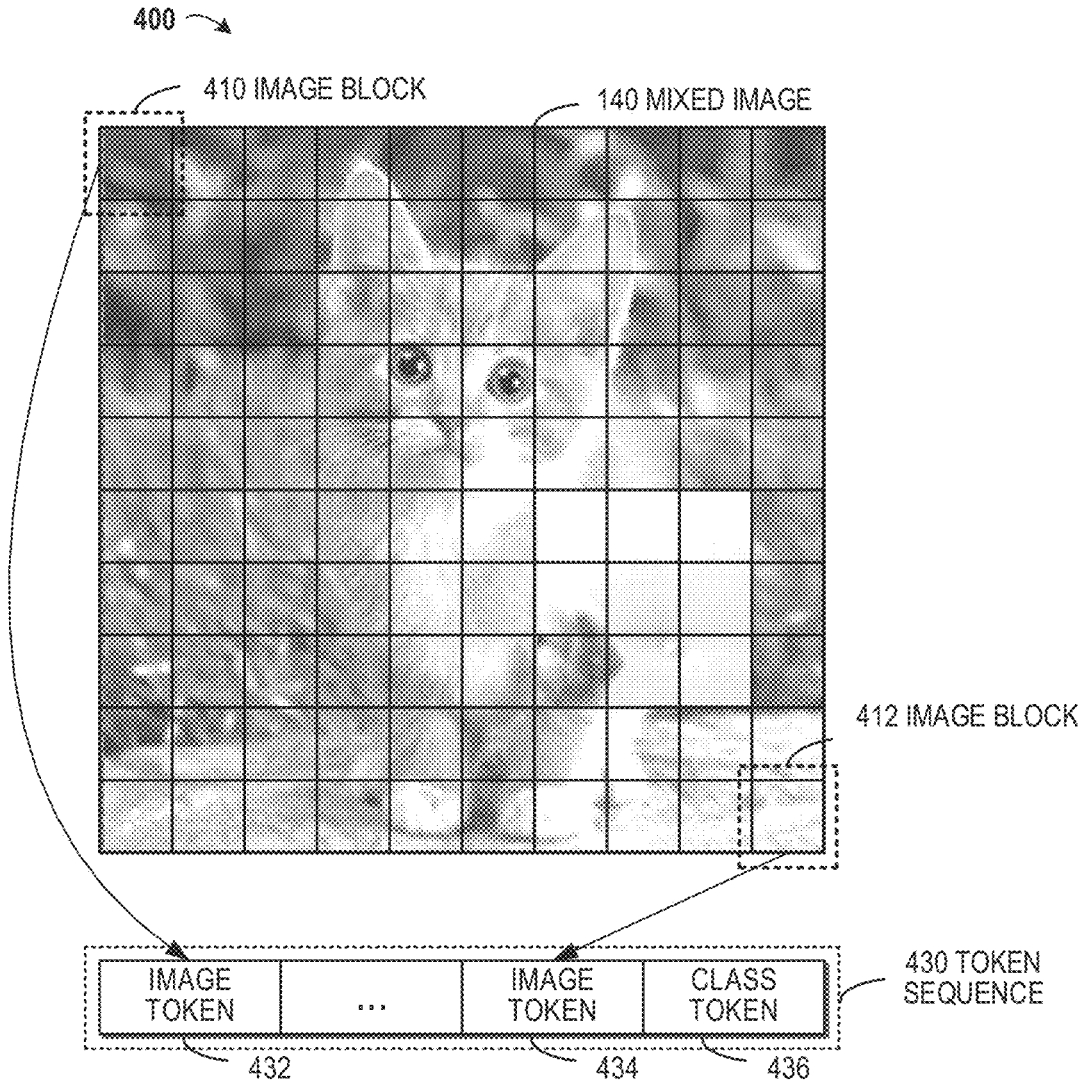
FIG. 4 illustrates an example diagram for building a token sequence according to implementations of the present disclosure.

Referring to FIG. 4 for more details about building the token sequence, here FIG. 4 illustrates an example diagram 400 for building a token sequence 430 from the mixed image 140 according to implementations of the present disclosure. As illustrated in FIG. 4, the mixed image 140 may be divided into a plurality of image blocks. Here, the mixed image 140 may be divided in various ways. For example, a size of the image block may be determined based on a size of any of the first image 110, the second images 120, and the mixed image 140. Specifically, a smaller image may be selected from the above images and the size of the image block should be less than the size of the selected image.

In another example, the size of the image block may be determined based on a size of any of the first portion 240 and the second portion 242. For example, a smaller portion may be selected and the size of the image block should be less than the size of the selected portion. In another example, the size of the image block may be determined based on a predetermined size (such as 16*16 or another size). Alternatively and/or in addition to, the size of the image block may be determined based on a predetermined number. For example, the mixed image 140 may be divided into 10*10 (or a different number) image blocks. Alternatively and/or in addition to, the size of the image blocks may be determined based on the mask. Therefore, the image blocks may be aligned to mask 230 so as to increase the accuracy level in further processing. Alternatively and/or in addition to, the size of the image blocks may be determined based on the size of the mixed image 140 and the size of the first portion 240. For example, a common divisor (in both the width direction and the height direction) for the size of the mixed image 140 and the size of the first portion 240 may be determined for defining the size of the image block. At this point, the mixed image 140 and the first portion 240 may be divisible by the image block, and thus the attention map 220 may be determined in an accurate way by aligning the image blocks to mask 230.

It is to be understood that the accuracy level for the label 230 and resource costs (such as the time and computation costs) depend on the number of the image blocks. A greater number may lead to a greater accuracy level as well as more resource costs. The above dividing method provides an effective and flexible way for dividing the mixed image 140, therefore a balance may be made between the accuracy level and the resource costs.

Although FIG. 4 shows that the mixed image 140 is divided in a grid mode (m*n, where m and n represents positive integers), the mixed image 140 may be divided in a linear mode (such as n*1, or 1*n). Once the image blocks are obtained, an image token may be generated for each image block. Supposing the mixed image 140 (represented as $x \in \mathbb{R}^{3*H*W}$, where H represents the height of the mixed image 140 and W represents the width of the mixed image 140) is divided into p (a positive integer) image blocks. At this point, p image tokens $x_{image}$ (each $x_{image} \in \mathbb{R}^{1*d}$, where d is the embedding length) are determined for the p image blocks, respectively. Specifically, an image token 432 may be generated for the first image block 410 in the mixed image 140, and an image token 434 may be generated for the last image block 412 in the mixed image 140. Further, a class token $x_{cls} \in \mathbb{R}^{1*d}$) may be appended to the end of the image tokens. Here, the class token may represent a token for an imaginary class block that is added to the end of the image blocks, so as to generate the token sequence 430. A value of the class token is learnable during the self-attention operation and may begin with a random initial value. At this point, the token sequence 430 comprises the plurality of image tokens 432, . . . , and 434 and the class token 436 associated with the attention map 220. Specifically, the token sequence 430 may be represented as an embedding $z=[x_{cls}, x_{image}] \in \mathbb{R}^{(1+p)*d}$.

Nowadays, transformers have been dominant in nearly all tasks in image processing and other processing environments. Specifically, transformer-based architectures like Vision Transformer (ViT) have been introduced into the field of computer vision and show great promise on tasks like image classification, object detection, image segmentation, and so on. In implementations of the present disclosure, the ViT model may be used for obtaining the attention map 220. For example, the mixed image 140 may be inputted into the ViT model, and then the ViT model may output the above embedding $z=[x_{cls}, x_{image}] \in \mathbb{R}^{(1+p)*d}$. With these implementations, the ViT model may be directly used for processing the mixed image 140 and then obtain the attention map 220 without introducing any extra parameters into the existing ViT model.

In implementations of the present disclosure, a self-attention map may be obtained for the token sequence 430 during the self-attention operation. Given a Transformer with g attention heads and input embedding z, the multi-head self-attention may be parametrized with projection matrices $w_q$, $w_k \in \mathbb{R}^{d*d}$. The self-attention for each head may be formulated according to the following formulas:

$$q=x_{cls} \cdot w_q \qquad\qquad \text{Formula 2}$$

$$k=z \cdot w_k \qquad\qquad \text{Formula 3}$$

$$A'=\text{Softmax}(q \cdot k^T / \sqrt{d/g}) \qquad\qquad \text{Formula 4}$$

where $q \cdot k^T \in \mathbb{R}^{1*(1+p)}$ indicates that the class token is a query whose corresponding keys are all the input tokens. The query parameter may be determined based on the above Formula 2, and the key parameter may be determined based on the above Formula 3. Then a self-attention map A' for the token sequence 430 may be determined based on the self-attention operation. Further, a dimension that corresponds to the class token 436 may be identified in the self-attention map as the attention map 220 based on Formula 5.

$$A_{cls}=\{A'_{0,i}|i \in [1,p]\} \qquad\qquad \text{Formula 5}$$

Here, $A_{cls} \in [0,1]^p$ is the attention map 220 projected from the class token 430 to the image tokens 432, . . . , and 434, respectively, and it may summarize which image blocks are the most useful to the final classifier. When there are multiple heads in the attention, an average operation may be implemented across all the attention heads to obtain $A_{cls} \in [0,1]^p$. Specifically, $A_{cls}$ in Formula 5 may work as the attention map 220 and may be available as an intermediate output from the last Transformer block without architecture modification. With these implementations, when the self-attention model (such as the ViT model) is used, the attention map 220 as determined from the above Formula 5 may be directly obtained from the ViT model without modifying the architecture of the model.

Figure 5:
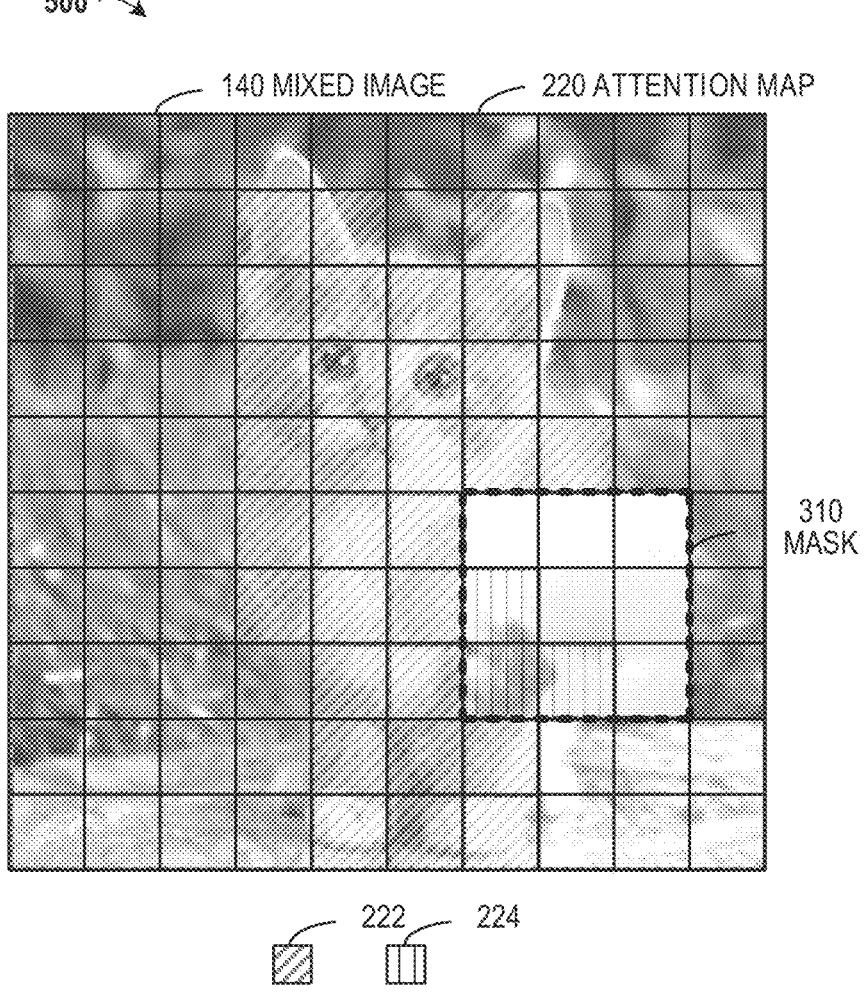
FIG. 5 illustrates an example diagram for determining a label for a mixed image based on an attention map according to implementations of the present disclosure.

Referring to FIG. 5 for more details about the attention map 220, here FIG. 5 illustrates an example diagram 500 for determining the label for the mixed image 140 based on the attention map 220 according to implementations of the present disclosure. As illustrated in FIG. 5, the attention map 220 has a grid format corresponding to the plurality of image blocks in the mixed image 140. Each image block may have a corresponding attention value within the range of [0,1]. In FIG. 5, the legend 222 indicates areas (with attention values greater than 0) within the second image 120, and legend 224 indicates areas (with attention values greater than 0) within the first image 110. With the attention map 220, contributions of the first and second images 110 and 120 may be considered in determining the label 230 for the mixed image 140 in a more accurate and effective way.

Once the attention map 220 is obtained, the attention map 220 may be used for determining the label 230 for the mixed image 140 according to the first label 210 for the first image 110 and the second label 212 for the second data 120. Specifically, a first weight (represented as $\lambda$) may be determined for the first image 110 based on the attention map 220 and the mask 310. Here, the first weight may be determined based on Formula 6 if the attention map 220 and the mask 310 have the same size:

$$\lambda=A_{cls} \cdot M \qquad\qquad \text{Formula 6}$$

Formula 6 shows a specific situation where the attention map 220 and the mask 310 are defined by the same size (for example, W*H pixels). At this point, each image block comprises only one pixel in the mixed image 140, and the resource costs may be high. Usually, the image block may comprise multiple pixels, which leads to a mismatch in sizes of the attention map 220 and the mask 310. In implementations of the present disclosure, the mask 310 may be down-sampled into a format corresponding to the number of the plurality of image blocks. In other words, the down-sampling procedure may fill the gap between the size difference between the attention map 220 and the mask 310, and then the first weight may be determined based on the attention map 230 and the down-sampled mask. Specifically, Formula 7 may be used for determining the first weight:

$$\lambda=A_{cls} \cdot \downarrow(M) \qquad\qquad \text{Formula 7}$$

Where $\downarrow(\cdot)$ represents the nearest-neighbor interpolation down-sampling that may align the original M (with a size of H*W) with the p image blocks. In implementations of the present disclosure, the dimension unsqueezing in Formula 7 may be omitted for simplicity. With these implementations, the network model may learn to re-assign the weight of labels for each data point dynamically based on their respective values in the attention map 220. The input that is better focused by the attention map 220 will be assigned with a higher value in the final label 230.

Next, the label 230 may be determined based on the first label 210 and the second label 212 and the first weight $\lambda$. In implementations of the present disclosure, the label 230 for the mixed image 140 may be determined from Formula 8:

$$\tilde{y} = \lambda y_A + (1-\lambda) y_B \qquad \text{Formula 8}$$

Where $\tilde{y}$ represents the label 230 for the mixed image 140, $\lambda$ represents the first weight for the first image 110, $y_A$ represents the first label 210 for the first image 110, and $y_B$ represent the second label 212 for the second image 120. With these implementations, the first label 210 and the second label 212 may be weighted according to corresponding contributions from the first image 110 and the second image 120. Therefore, the label 210 may reflect a real classification of the mixed image 140 in a more reliable way.

Figure 6:
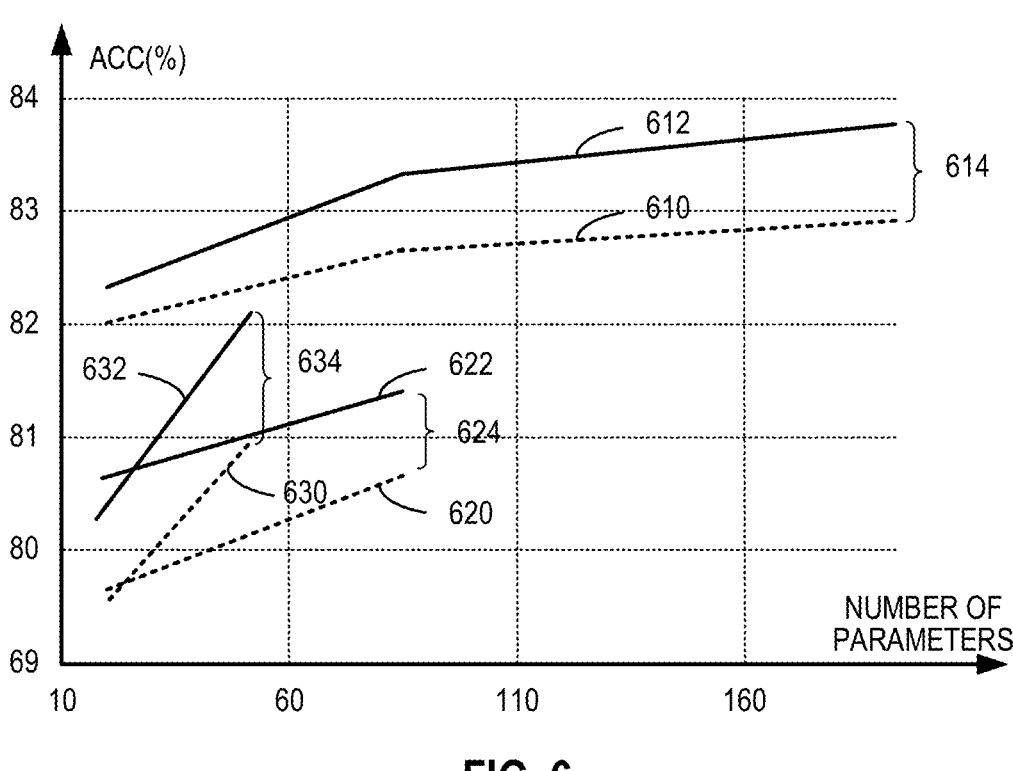
FIG. 6 illustrates an example diagram for comparisons between accuracy levels of multiple solutions according to implementations of the present disclosure.

FIG. 6 illustrates an example diagram 600 for comparisons between accuracy levels of multiple solutions according to implementations of the present disclosure. As illustrated in FIG. 6, the proposed TransMix solution may steadily improve the accurate level of the data augmentation. Meanwhile, the proposed TransMix solution involves no extra parameter and slight resource costs. In FIG. 6, the horizontal axis indicates the number of parameters that are involved in the model, and the vertical axis indicates the accuracy level of the output of the model. Specifically, a curve 610 relates to the performance of a conventional XCiT (Cross-Covariance Image Transformer) model and shows an association relationship between the accuracy level and the number of parameters; and a curve 612 relates to an XCiT model to which the proposed TransMix solution is applied. As showed by an offset 614 between the two curves 610 and 612, the proposed TransMix solution increases the accuracy by 0.9%. Further, a curve 620 relates to a conventional PVT (Pyramid Vision Transformer) model and a curve 622 relates to a PVT model where the proposed TransMix solution is applied. Moreover, a curve 630 relates to a conventional DeiT (Data-efficient image Transformer) model and a curve 632 relates to a DeiT model where the proposed TransMix solution is applied. Offsets 624 and 634 also show that the proposed TransMix solution achieves higher accuracy levels.

The above parameters have provided descriptions for detailed steps for the data augmentation, hereinafter, Table 1 provides an example algorithm for implementing the proposed TransMix. In implementations of the present disclosure, the following algorithm shown in Table 1 may be used for determining the label.

TABLE 1

| Pseudocode of TransMix in a PyTorch-like style | |
|---|---|
| Line No. | Pseudocode |
| Lines 1-5 | # H, W: the height and width of the input image<br># p: number of image blocks<br># M: 0-initialized mask with shape (H,W)<br># downsample: downsample from length (H*W) to (p)<br># (bx1, bx2, by1, by2): bounding box coordinate |
| Line 6 | for (x, y) in loader: # load a minibatch with N pairs |
| Lines 7-10 | # CutMix image in a minibatch<br>M[bx1:bx2, by1:by2] = 1<br>x[:,:,M==1] = x.flip(0)[:,:,M==1]<br>M = downsample(M.view(-1)) |
| Lines 11-12 | # attention matrix A: (N, p)<br>logits, A = model(x) |
| Lines 13-14 | # Mix labels with the attention map<br>lam = matmul(A, M) |
| Lines 15-16 | y = (1-lam) * y + lam * y.flip(0)<br>CrossEntropyLoss(logits, y).backward( ) |

In Table 1, Lines 1-5 are notes for the main variables; Lines 7-10 determine the mixed image 140 and down-samples the mask 310; Lines 11-12 calculate the attention map 220; Lines 13-14 determine the first weight); and Lines 15-16 determine the label 230 for the mixed image 140. With the above pseudocode, the mixed image 140 and the corresponding label 230 may be effectively generated from two source images.

Figure 7A:
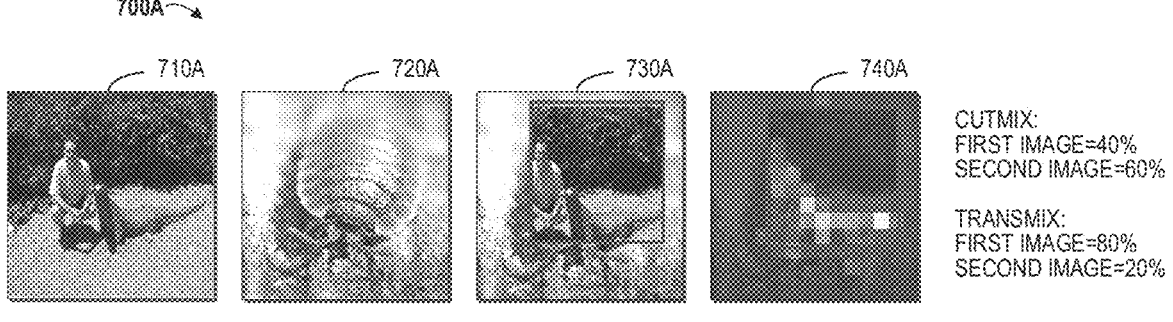
FIGS. 7A-7C illustrate example diagrams for data augmentation according to implementations of the present disclosure.
Figure 7B:
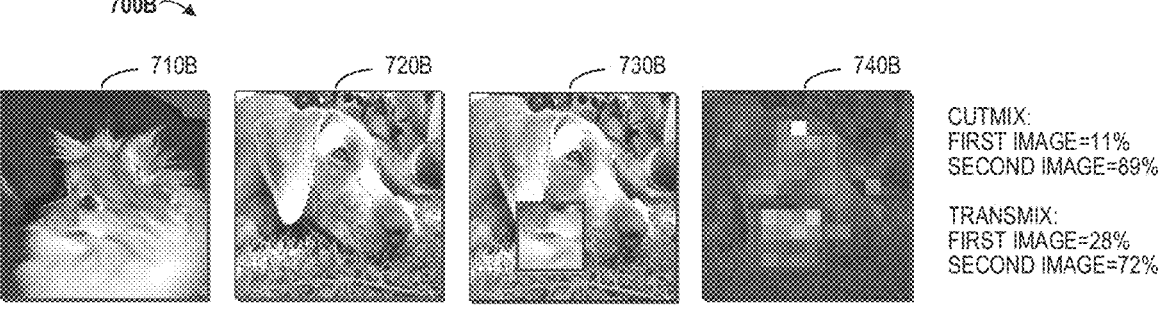
Figure 7C:
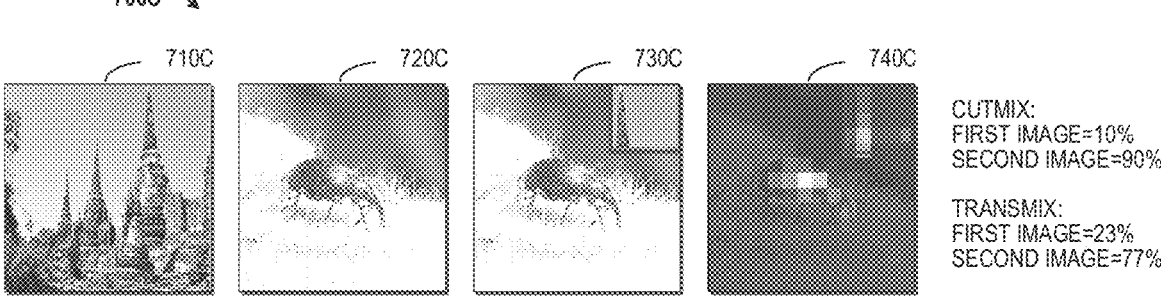

FIGS. 7A-7C illustrate example diagrams 700A, 700B and 700C for data augmentation according to implementations of the present disclosure. As illustrated in FIG. 7A, a first image 710A and a second image 720A are used to generate a mixed image 730A. Based on the above TransMix solution, an attention map 740A is determined for the mixed image 730A. Compared with the conventional CutMix solution, the first weight for the first image 710A is updated to 80% from 40%, and the second weight for the second image 720A is updated to 20% from 60%. In FIG. 7B, a mixed image 730B is generated, and an attention map 740B is determined for the mixed image 730B. Compared with the conventional CutMix solution, the first weight for the first image 710B is updated to 28% from 11%, and the second weight for the second image 720B is updated to 89% from 72%. In FIG. 7C, a mixed image 730C is generated, and an attention map 740C is determined for the mixed image 730C. Compared with the conventional CutMix solution, the first weight for the first image 710C is updated to 23% from 10%, and the second weight for the second image 720C is updated to 77% from 90%. With these implementations of the present disclosure, the label for the mixed image may be dynamically adjusted based on contributions of the first and second images to the mixed data. Therefore, the label may be generated in a more reliable and effective way.

In implementations of the present disclosure, a training sample may be generated based on the mixed image 140 and the label 230, and then the training sample may be used for training a data model describing an association relationship between data and a label for the data. Continuing the above example of the classifying model, the training sample including the mixed image 140 and the label 230 may be used for optimizing the classifying mode. With these implementations of the present disclosure, more training samples may be generated for optimizing the model, therefore human labor in providing manual labels are decreased. Further, a great number of training samples may be generated automatically from existing training samples, such that the data model may be trained fully and completely.

In implementations of the present disclosure, a group of images (for example, the existing training samples) may be received for generating more training samples. Then, a pair of images may be selected as the first and second images 110 and 120 from the group of images. Supposing there are 2k images, the $i^{th}$ image and the $(2k-i)^{th}$ image may be used to generate a mixed image and then a training sample may be obtained based on the mixed image and a corresponding label for the mixed image.

Although the above paragraphs have described the procedure for generating a label for an image mixed from two source images, the above TransMix solution may be implemented to an image that is mixed from more than two source images. Specifically, the weight for each source image may be determined based on the attention map and a corresponding mask. Further, the label may be determined based on respective weights and respective labels for the source images.

Although the above paragraphs have described the data augmentation in the environment of image processing, the proposed TransMix solution may be adapted to another environment such as text processing, audio processing, and so on. For example, with respect to a text model for classifying an article into a corresponding technical field, two articles may be merged into a mixed article and then a label may be generated for the mixed article. With these implementations of the present disclosure, the proposed TransMix may be implemented in various environments, such that more training samples may be generated for training a specific model.

With the proposed TransMix solution, a simple yet effective data augmentation technique is proposed, and it may assign "Mixed" labels with attentional guidance for Vision Transformers. Here, the proposed TransMix solution naturally exploits the Transformer's attention map to assign the confidence for the mixed-target, and thus increases the accuracy levels for multiple image processing models. Further, effectiveness, transferability, robustness, and generalizability of the proposed TransMix solution are also increased without significant resource costs.

In implementations of the present disclosure, the proposed TransMix solution may be used for pre-training. Image database (for example, ImageNet) model pre-training is the fundamental practice for many visual recognition tasks. Before training for downstream tasks, weights pre-trained on ImageNet may be used to initialize the Transformer backbone. Facilitated with the proposed TransMix solution, the pre-trained model may achieve better performance and thus improve the accuracy level of the downstream tasks. In implementations of the present disclosure, the TransMix solution may be transferred to downstream tasks including semantic segmentation, object detection, instance segmentation, and so on.

In implementations of the present disclosure, the proposed TransMix solution may also improve ViT-based models' robustness and out-of-distribution performance. For example, the TransMix pre-trained models may achieve better performance on four robustness scenarios including occlusion, spatial structure shuffling, natural adversarial example, and out-of-distribution detection. In implementations of the present disclosure, the proposed TransMix solution and the attention technique may work together and achieve mutual effects.

The above paragraphs have described details for the data augmentation. According to implementations of the present disclosure, a method is provided for data augmentation. Reference will be made to FIG. 8 for more details about the method, where FIG. 8 illustrates an example flowchart of a method 800 for data augmentation according to implementations of the present disclosure. At a block 810, mixed data is generated from first data and second data, the mixed data comprising a first portion from the first data and a second portion from the second data. At a block 820, an attention map is obtained for the mixed data based on distributions of the first and second portions in the mixed data, the attention map describing contributions of the first and second data to the mixed data. At a block 830, a label is determined for the mixed data based on the attention map and a first label for the first data and a second label for the second data.

In implementations of the present disclosure, obtaining the attention map comprises: dividing the mixed data into a plurality of data blocks; determining a plurality of data tokens for the plurality of data blocks, respectively; and obtaining the attention map based on a self-attention operation to a token sequence that comprises the plurality of data tokens and a class token associated with the attention map.

In implementations of the present disclosure, obtaining the attention map comprises: determining a query parameter and a key parameter for the self-attention operation based on the token sequence; and obtaining the attention map based on the query and key parameters for the self-attention operation.

In implementations of the present disclosure, obtaining the attention map based on the query and key parameters for the self-attention operation comprises: obtaining a self-attention map for the token sequence during the self-attention operation; and identifying a dimension, corresponding to the class token, in the self-attention map as the attention map.

In implementations of the present disclosure, generating the mixed data comprises: determining a mask describing a boundary between the first and second portions in the mixed data; and generating the mixed data by pasting the first portion into the second data based on the mask.

In implementations of the present disclosure, dividing the mixed data comprises dividing the mixed data based on any of: a size of any of the first and second data, and the mixed data; a size of any of the first and second portions; a predetermined size; a predetermined number; and the mask.

In implementations of the present disclosure, determining the label for the mixed data comprises: determining a first weight for the first label based on the attention map and the mask; and determining the label based on the first and second labels and the first weight.

In implementations of the present disclosure, determining the first weight comprises: down-sampling the mask into a format corresponding to the number of the plurality of data blocks; and determining the first weight based on the attention map and the down-sampled mask.

In implementations of the present disclosure, the method further comprises: generating a training sample based on the mixed data and the label, the training sample being for training a data model describing an association relationship between data and a label for the data.

In implementations of the present disclosure, the first data is a first image and the second data is a second image, the self-attention operation is implemented by a vision transformer, and generating the training sample further comprises: receiving a group of images that are used for training the data model; and selecting the first and second images from the group of images for generating the training sample.

According to implementations of the present disclosure, an apparatus is provided for data augmentation. The apparatus comprises: a generating unit, configured for generating mixed data from first data and second data, the mixed data comprising a first portion from the first data and a second portion from the second data; an obtaining unit, configured for obtaining an attention map for the mixed data based on distributions of the first and second portions in the mixed data, the attention map describing contributions of the first and second data to the mixed data; and a determining unit, for determining a label for the mixed data based on the attention map and a first label for the first data and a second label for the second data. Further, the apparatus may comprise other units for implementing other steps in the method 800.

According to implementations of the present disclosure, an electronic device is provided for implementing the method 800. The electronic device comprises: a computer processor coupled to a computer-readable memory unit, the memory unit comprising instructions that when executed by the computer processor implements a method for data augmentation. The method comprises: generating mixed data from first data and second data, the mixed data comprising a first portion from the first data and a second portion from the second data; obtaining an attention map for the mixed data based on distributions of the first and second portions in the mixed data, the attention map describing contributions of the first and second data to the mixed data; and determining a label for the mixed data based on the attention map and a first label for the first data and a second label for the second data.

In implementations of the present disclosure, obtaining the attention map comprises: dividing the mixed data into a plurality of data blocks; determining a plurality of data tokens for the plurality of data blocks, respectively; and obtaining the attention map based on a self-attention operation to a token sequence that comprises the plurality of data tokens and a class token associated with the attention map.

In implementations of the present disclosure, obtaining the attention map comprises: determining a query parameter and a key parameter for the self-attention operation based on the token sequence; and obtaining the attention map based on the query and key parameters for the self-attention operation.

In implementations of the present disclosure, obtaining the attention map based on the query and key parameters for the self-attention operation comprises: obtaining a self-attention map for the token sequence during the self-attention operation; and identifying a dimension, corresponding to the class token, in the self-attention map as the attention map.

In implementations of the present disclosure, generating the mixed data comprises: determining a mask describing a boundary between the first and second portions in the mixed data; and generating the mixed data by pasting the first portion into the second data based on the mask.

In implementations of the present disclosure, dividing the mixed data comprises dividing the mixed data based on any of: a size of any of the first and second data, and the mixed data; a size of any of the first and second portions; a predetermined size; a predetermined number; and the mask.

In implementations of the present disclosure, determining the label for the mixed data comprises: determining a first weight for the first label based on the attention map and the mask; and determining the label based on the first and second labels and the first weight.

In implementations of the present disclosure, determining the first weight comprises: down-sampling the mask into a format corresponding to the number of the plurality of data blocks; and determining the first weight based on the attention map and the down-sampled mask.

In implementations of the present disclosure, the first data is a first image and the second data is a second image, the self-attention operation is implemented by a vision transformer, and the method further comprising: selecting the first and second images from a group of images that are used for training a data model, the data model describing an association relationship between data and a label for the data; generating a training sample for training the data model based on the mixed data and the label.

According to implementations of the present disclosure, a computer program product, the computer program product comprising a computer readable storage medium having program instructions embodied therewith, the program instructions executable by an electronic device to cause the electronic device to perform the method 800.

Figure 9:
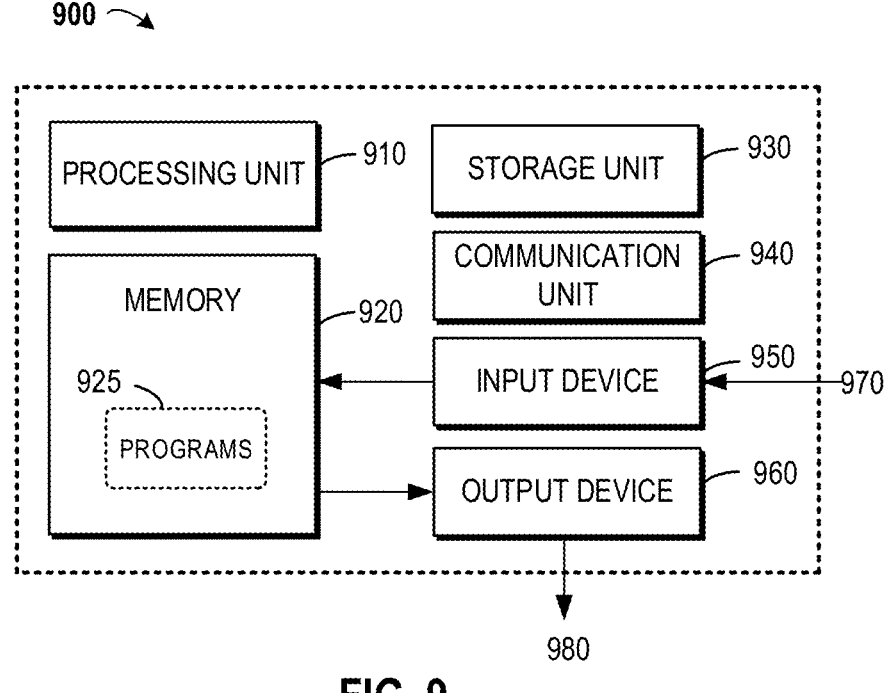
FIG. 9 illustrates a block diagram of a computing device in which various implementations of the present disclosure can be implemented.

FIG. 9 illustrates a block diagram of a computing device 900 in which various implementations of the present disclosure can be implemented. It would be appreciated that the computing device 900 shown in FIG. 9 is merely for purpose of illustration, without suggesting any limitation to the functions and scopes of the present disclosure in any manner. The computing device 900 may be used to implement the above method 1000 in implementations of the present disclosure. As shown in FIG. 9, the computing device 900 may be a general-purpose computing device. The computing device 900 may at least comprise one or more processors or processing units 910, a memory 920, a storage unit 930, one or more communication units 940, one or more input devices 950, and one or more output devices 960.

The processing unit 910 may be a physical or virtual processor and can implement various processes based on programs stored in the memory 920. In a multi-processor system, multiple processing units execute computer executable instructions in parallel so as to improve the parallel processing capability of the computing device 900. The processing unit 910 may also be referred to as a central processing unit (CPU), a microprocessor, a controller, or a microcontroller.

The computing device 900 typically includes various computer storage medium. Such medium can be any medium accessible by the computing device 900, including, but not limited to, volatile and non-volatile medium, or detachable and non-detachable medium. The memory 920 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 930 may be any detachable or non-detachable medium and may include a machine-readable medium such as a memory, flash memory drive, magnetic disk, or another other media, which can be used for storing information and/or data and can be accessed in the computing device 900.

The computing device 900 may further include additional detachable/non-detachable, volatile/non-volatile memory medium. Although not shown in FIG. 9, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 940 communicates with a further computing device via the communication medium. In addition, the functions of the components in the computing device 900 can be implemented by a single computing cluster or multiple computing machines that can communicate via communication connections. Therefore, the computing device 900 can operate in a networked environment using a logical connection with one or more other servers, networked personal computers (PCs) or further general network nodes.

The input device 950 may be one or more of a variety of input devices, such as a mouse, keyboard, tracking ball, voice-input device, and the like. The output device 960 may be one or more of a variety of output devices, such as a display, loudspeaker, printer, and the like. By means of the communication unit 940, the computing device 900 can further communicate with one or more external devices (not shown) such as the storage devices and display device, with one or more devices enabling the user to interact with the computing device 900, or any devices (such as a network card, a modem, and the like) enabling the computing device 900 to communicate with one or more other computing devices, if required. Such communication can be performed via input/output (I/O) interfaces (not shown).

In some implementations, instead of being integrated in a single device, some, or all components of the computing device 900 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or," unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A method for data augmentation, comprising:
   generating mixed data from first data and second data, the mixed data comprising a first portion from the first data and a second portion from the second data;
   dividing the mixed data into a plurality of data blocks based on a mask describing a boundary between the first and second portions in the mixed data, wherein dividing the mixed data further comprises dividing the mixed data based on any of:
   a size of any of the first and second data, and the mixed data;
   a size of any of the first and second portions;
   a predetermined size; and
   a predetermined number;
obtaining an attention map for the plurality of data blocks in the mixed data based on distributions of the first and second portions in the mixed data, the attention map describing contributions of the first and second data to the mixed data; and
determining a label for the mixed data based on a first label for the first data, a second label for the second data, and the attention map.

2. The method of claim 1, wherein obtaining the attention map comprises:
   determining a plurality of data tokens for the plurality of data blocks, respectively; and
   obtaining the attention map based on a self-attention operation to a token sequence that comprises the plurality of data tokens and a class token associated with the attention map.

3. The method of claim 2, wherein obtaining the attention map comprises:
   determining a query parameter and a key parameter for the self-attention operation based on the token sequence; and
   obtaining the attention map based on the query and key parameters for the self-attention operation.

4. The method of claim 3, wherein obtaining the attention map based on the query and key parameters for the self-attention operation comprises:
   obtaining a self-attention map for the token sequence during the self-attention operation; and
   identifying a dimension, corresponding to the class token, in the self-attention map as the attention map.

5. The method of claim 2, wherein
   the mixed data is generated by pasting the first portion into the second data based on the mask.

6. The method of claim 2, further comprising: generating a training sample based on the mixed data and the label, the training sample being for training a data model describing an association relationship between data and a label for the data.

7. The method of claim 6, wherein the first data is a first image and the second data is a second image, the self-attention operation is implemented by a vision transformer, and generating the training sample further comprises:
   receiving a group of images that are used for training the data model; and
   selecting the first and second images from the group of images for generating the training sample.

8. The method of claim 1, wherein determining the first weight comprises:
   down-sampling the mask into a format corresponding to the number of the plurality of data blocks; and
   determining the first weight based on the attention map and the down-sampled mask.

9. The method of claim 1, wherein determining the label for the mixed data comprises:
   determining a first weight for the first label based on the attention map and the mask; and
   determining the label based on the first and second labels and the first weight.

10. An electronic device, comprising a computer processor coupled to a computer-readable memory unit, the memory unit comprising instructions that when executed by the computer processor implements a method for data augmentation, comprising:

generating mixed data from first data and second data, the mixed data comprising a first portion from the first data and a second portion from the second data;

dividing the mixed data into a plurality of data blocks based on a mask describing a boundary between the first and second portions in the mixed data, wherein dividing the mixed data further comprises dividing the mixed data based on any of:

a size of any of the first and second data, and the mixed data;

a size of any of the first and second portions;

a predetermined size; and a predetermined number;

obtaining an attention map for the plurality of data blocks in the mixed data based on distributions of the first and second portions in the mixed data, the attention map describing contributions of the first and second data to the mixed data; and determining a label for the mixed data based on a first label for the first data, a second label for the second data, and the attention map.

11. The device of claim 10, wherein obtaining the attention map comprises:

determining a plurality of data tokens for the plurality of data blocks, respectively; and obtaining the attention map based on a self-attention operation to a token sequence that comprises the plurality of data tokens and a class token associated with the attention map.

12. The device of claim 11, wherein obtaining the attention map comprises:

determining a query parameter and a key parameter for the self-attention operation based on the token sequence; and obtaining the attention map based on the query and key parameters for the self-attention operation.

13. The device of claim 12, wherein obtaining the attention map based on the query and key parameters for the self-attention operation comprises:

obtaining a self-attention map for the token sequence during the self-attention operation; and identifying a dimension, corresponding to the class token, in the self-attention map as the attention map.

14. The device of claim 11, wherein
the mixed data is generated by pasting the first portion into the second data based on the mask.

15. The device of claim 11, wherein the first data is a first image and the second data is a second image, the self-attention operation is implemented by a vision transformer, and the method further comprising:

selecting the first and second images from a group of images that are used for training a data model, the data model describing an association relationship between data and a label for the data;

generating a training sample for training the data model based on the mixed data and the label.

16. The device of claim 10, wherein determining the first weight comprises:

down-sampling the mask into a format corresponding to the number of the plurality of data blocks; and determining the first weight based on the attention map and the down-sampled mask.

17. The device of claim 10, wherein determining the label for the mixed data comprises:

determining a first weight for the first label based on the attention map and the mask; and determining the label based on the first and second labels and the first weight.

18. A computer program product, the computer program product comprising a non-transitory computer readable storage medium having program instructions embodied therewith, the program instructions executable by an electronic device to cause the electronic device to perform a method for data augmentation, the method comprising:

generating mixed data from first data and second data, the mixed data comprising a first portion from the first data and a second portion from the second data;

dividing the mixed data into a plurality of data blocks based on a mask describing a boundary between the first and second portions in the mixed data, wherein dividing the mixed data further comprises dividing the mixed data based on any of:

a size of any of the first and second data, and the mixed data;

a size of any of the first and second portions;

a predetermined size; and a predetermined number;

obtaining an attention map for the plurality of data blocks in the mixed data based on distributions of the first and second portions in the mixed data, the attention map describing contributions of the first and second data to the mixed data; and determining a label for the mixed data based on a first label for the first data, a second label for the second data, and the attention map.

* * * * *